(12) United States Patent
Shiriya

(10) Patent No.: US 11,130,162 B2
(45) Date of Patent: Sep. 28, 2021

(54) WORK REVERSING APPARATUS, PRESS TRANSPORTING LINE AND WORK REVERSING METHOD

(71) Applicant: AIDA ENGINEERING, LTD., Kanagawa (JP)

(72) Inventor: Shunichi Shiriya, Hakusan (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 1 day.

(21) Appl. No.: 16/755,141

(22) PCT Filed: Oct. 9, 2018

(86) PCT No.: PCT/JP2018/037615
§ 371 (c)(1),
(2) Date: Apr. 9, 2020

(87) PCT Pub. No.: WO2019/073976
PCT Pub. Date: Apr. 18, 2019

(65) Prior Publication Data
US 2020/0331049 A1    Oct. 22, 2020

(30) Foreign Application Priority Data
Oct. 10, 2017    (JP) .............................. JP2017-197044

(51) Int. Cl.
*B21D 22/02*    (2006.01)
*B65G 47/244*   (2006.01)
*B65G 47/248*   (2006.01)
(Continued)

(52) U.S. Cl.
CPC ........... *B21D 22/02* (2013.01); *B65G 47/244* (2013.01); *B65G 47/248* (2013.01);
(Continued)

(58) Field of Classification Search
CPC .............. B65G 47/244; B65G 47/2445; B65G 47/248; B65G 47/252; B21D 22/02; B21D 43/145
See application file for complete search history.

(56) References Cited

U.S. PATENT DOCUMENTS 8,181,767 B2 *   5/2012  Gales ................... B65G 47/252
                                                        198/404
2003/0155214 A1  8/2003  Trieb
(Continued)

FOREIGN PATENT DOCUMENTS

| CN | 1439585 A   | 9/2003  |
| CN | 101549799 A | 10/2009 |
| CN | 102325709 A | 1/2012  |

(Continued)

OTHER PUBLICATIONS

Extended European Search Report issued in corresponding European Patent Application No. 18865991.6, dated Sep. 17, 2020.
(Continued)

*Primary Examiner* — William R Harp
(74) *Attorney, Agent, or Firm* — McDermott Will & Emery LLP (57) ABSTRACT

A work reversing apparatus includes: a first conveyor that transports a work; a second conveyor that transports a work; and a rotary driving unit that integrally rotates the first conveyor and the second conveyor. The rotary driving unit rotates the first conveyor and the second conveyor around a rotation center axis that extends in a direction perpendicular to a transporting direction of a work on the first conveyor and the second conveyor. By driving the rotary driving unit, a work can be reversed around the rotation center axis that extends in a direction perpendicular to the transporting direction.

7 Claims, 9 Drawing Sheets

(51) Int. Cl.
    *B65G 47/90*     (2006.01)
    *B65G 47/252*    (2006.01)
(52) U.S. Cl.
    CPC ....... *B65G 47/2445* (2013.01); *B65G 47/252* (2013.01); *B65G 47/905* (2013.01)

(56)         References Cited

U.S. PATENT DOCUMENTS

2010/0219042 A1   9/2010   Gales et al.
2012/0037475 A1   2/2012   Baccini et al.

FOREIGN PATENT DOCUMENTS

| CN | 106044144 A  | 10/2016 |
| JP | S54-128271 U | 9/1979  |
| JP | S60-16422 U  | 2/1985  |
| JP | S63-101130 U | 7/1988  |
| JP | H11-278649 A | 10/1999 |
| JP | 2000-71032 A | 3/2000  |
| JP | 2012-096888 A| 5/2012  |
| JP | 5334443 B2   | 11/2013 |

OTHER PUBLICATIONS

Chinese Office Action issued in corresponding Chinese Patent Application No. 201880059603.5, dated Feb. 25, 2021, with English translation.
International Search Report issued in corresponding International Patent Application No. PCT/JP2018/037615, dated Jan. 8, 2019, with English translation.

\* cited by examiner

WORK REVERSING APPARATUS, PRESS TRANSPORTING LINE AND WORK REVERSING METHOD

RELATED APPLICATIONS

This application is the U.S. National Phase under 35 U.S.C. § 371 of International Application No. PCT/JP2018/037615, filed on Oct. 9, 2018, which in turn claims the benefit of Japanese Application No. 2017-197044, filed on Oct. 10, 2017, the disclosures of which Applications are incorporated by reference herein.

TECHNICAL FIELD

The present disclosure relates to a work reversing apparatus, a press transporting line and a work reversing method which enable to reverse a work and efficiently carry in and carry out a work.

BACKGROUND ART

A reversing apparatus for a panel (work) processed by a press machine has been proposed (see JP-UM-A-S63-101130). The panel reversing apparatus of this example has: a first panel receiver that can reciprocate and rotate between a panel receiving position where a supplied panel (work) is received, and a panel ejecting position where this panel is ejected in an approximately reversed state; and a second panel receiver which can be set at a panel receiving position where the panel ejected from the first panel receiver is received, and a panel ejecting position where this panel is ejected in a reversed state, by being rotated in the opposite side of the first panel receiver, interlocking with the first panel receiver.

In this panel reversing apparatus, the panel (work) is transferred by the first panel receiver and the second panel receiver reciprocating and rotating, hence the next panel (work) cannot be supplied to the first panel receiver until the first panel receiver returns to a predetermined position. Therefore the operation time of the panel reversing apparatus cannot be decreased, and the productivity of the transporting line, including the panel reversing apparatus, cannot be improved.

Further, a work reversing apparatus having a work adsorption unit has been proposed (see JP-A-2000-71032). In this example, the work reversing apparatus has: a first transporting unit which includes a work adsorption unit, and is constituted by an endless conveyor which can rotate forward and backward; and a second transporting unit which is disposed so that the downstream end of the first transporting unit wraps around it, includes a work adsorption unit, and is constituted by an endless conveyor of which upstream end can oscillate vertically.

In the case of this work reversing apparatus, the work adsorption unit holding a work moves around a sprocket disposed at the edge of the endless conveyor, and as a result, this makes it difficult to use this apparatus for a long work. Further, a space for a work to turn around the sprocket is necessary, which makes it difficult to downsize the work reversing apparatus.

SUMMARY OF INVENTION

Technical Problem

Embodiments of the present disclosure provide a work reversing apparatus, a press transporting line and a work reversing method which enable to reverse a work and carry in and carry out the work efficiently.

Solution to Problem

According to a first aspect of the present disclosure, there is provide a work reversing apparatus including:
a first conveyor which transports a work;
a second conveyor which transports a work; and
a rotary driving unit which integrally rotates the first conveyor and the second conveyor,
a first transporting surface of the first conveyor for transporting a work being disposed to face a second transporting surface of the second conveyor for transporting a work,
the first conveyor and the second conveyor being able to hold works regardless of the directions of the first transporting surface and the second transporting surface during the rotation, and
when the rotary driving unit rotates the first conveyor and the second conveyor, the second transporting surface moving to a position where the first transporting surface has been located immediately before the rotation, the first transporting surface moving to a position where the second transporting surface has been located immediately before the rotation, a work being carried in to one of the first conveyor and the second conveyor, and a work being carried out from the other of the first conveyer and the second conveyer.

According to a second aspect of the present disclosure, there is provide a press transporting line including:
the above work reversing apparatus;
a press machine;
an upstream conveyor disposed between the press machine and the work reversing apparatus; and
a downstream conveyor disposed on a downstream side of the work reversing apparatus,
the upstream conveyor carrying a work processed by the press machine into the work reversing apparatus, and the work reversing apparatus reversing the work and carrying the work out to the downstream conveyor.

According to a third aspect of the present disclosure, there is provide a work reversing method using a work reversing apparatus that includes:
a first conveyor which transports a work;
a second conveyor which transports a work; and
a rotary driving unit which integrally rotates the first conveyor and the second conveyor,
a first transporting surface of the first conveyor for transporting a work being disposed to face a second transporting surface of the second conveyor for transporting a work,
the first conveyor and the second conveyor being able to hold works regardless of the directions of the first transporting surface and the second transporting surface during the rotation, and
the method including:
carrying a work in to the first transporting surface from an upstream side in a transporting direction of the work, and carrying a work out from the second transporting surface to a downstream side in the transporting direction; and
integrally rotating the first conveyor and the second conveyor to transpose the positions of the first transporting surface and the second transporting surface, and to carry a work out from the first transporting surface, to which the work has been carried in immediately before the rotation, to the downstream side in the transporting direction, and to carry a work in to the second transporting surface from the upstream side in the transporting direction.

DESCRIPTION OF EMBODIMENTS

According to one embodiment of the present disclosure, there is provided a work reversing apparatus including:
a first conveyor which transports a work;
a second conveyor which transports a work; and
a rotary driving unit which integrally rotates the first conveyor and the second conveyor,
a first transporting surface of the first conveyor for transporting a work being disposed to face a second transporting surface of the second conveyor for transporting a work,
the first conveyor and the second conveyor being able to hold works regardless of the directions of the first transporting surface and the second transporting surface during the rotation, and
when the rotary driving unit rotates the first conveyor and the second conveyor, the second transporting surface moving to a position where the first transporting surface has been located immediately before the rotation, the first transporting surface moving to a position where the second transporting surface has been located immediately before the rotation, a work being carried in to one of the first conveyor and the second conveyor, and a work being carried out from the other of the first conveyer and the second conveyor.

According to the above work reversing apparatus, the rotary driving unit reverses a work, and a work is carried in to one of the first transporting surface and the second transporting surface, which are disposed to face each other, and a work is carried out from the other thereof, whereby works can be efficiently carried in and carried out. Further, according to the above work reversing apparatus, the first transporting surface and the second transporting surface are disposed to face each other, and can hold works respectively, hence the entire apparatus can be downsized.

In the work reversing apparatus, the rotary driving unit may rotate the first conveyor and the second conveyor around a rotation center axis that extends in a direction perpendicular to a transporting direction of works on the first conveyor and the second conveyor.

According to the work reversing apparatus, a work can be reversed around the rotation center axis that extend in a direction perpendicular to the transporting direction.

In the work reversing apparatus, the rotary driving unit may rotate the first conveyor and the second conveyor around a rotation center axis that extends in a direction parallel with a transporting direction of works on the first conveyor and the second conveyor.

According to the work reversing apparatus, a work can be reversed around the rotation center axis that is parallel with the transporting direction.

The work reversing apparatus may further include:
a first detector which detects entry of a work into the first transporting surface;
a second detector which detects entry of a work into the second transporting surface; and
a controller which receives signals from the first detector and the second detector, and controls driving of the rotary driving unit,
wherein the controller drives the rotary driving unit and rotates the first conveyor and the second conveyor after confirming that a work whose entry into the first transporting surface is detected by the first detector is carried in to a predetermined position on the first transporting surface from an upstream side in a transporting direction of the work, and confirming that a work is carried out from the second conveyor and no longer exists on the second transporting surface, and
in a state that the second transporting surface is moved to the position where the first transporting surface has been located immediately before the rotation, the controller drives the rotary driving unit and rotates the second conveyor and the first conveyor after confirming that a work whose entry into the second transporting surface is detected by the second detector is carried in to a predetermined position on the second transporting surface from the upstream side in the transporting direction of the work, and confirming that a work is carried out from the first conveyor and no longer exists on the first transporting surface.

According to the work reversing apparatus, a position of a work on each transporting surface is confirmed, whereby the controller can determine whether the first conveyor and the second conveyor can be rotated.

In the work reversing apparatus,
the first conveyor may include a first holding unit that holds a work on the first transporting surface, and a first guide provided between the first and second transporting surfaces and extending in a direction parallel with the first transporting surface and second transporting surface, and
the second conveyor may include a second holding unit that holds a work on the second transporting surface, and a second guide provided between the second transporting surface and the first transporting surface and extending in a direction parallel with the second and first transporting surfaces.

According to the work reversing apparatus, dropping a work located distant from the first holding unit or the second holding unit can be prevented by disposing the first guide and the second guide in a direction parallel with the first and second transporting surfaces.

According to one embodiment of the present disclosure, there is provided a press transporting line including:

the above work reversing apparatus;

a press machine;

an upstream conveyor disposed between the press machine and the work reversing apparatus; and a downstream conveyor disposed on a downstream side of the work reversing apparatus, the upstream conveyor carrying a work processed by the press machine into the work reversing apparatus, and the work reversing apparatus reversing the work and carrying the work out to the downstream conveyor.

According to the above press transporting line, works processed by the press machine can be efficiently reversed by the work reversing apparatus, and transported to the downstream side of the press transporting line.

According to one embodiment of the present disclosure, there is provided a work reversing method using a work reversing apparatus that includes:

a first conveyor which transports a work;

a second conveyor which transports a work; and a rotary driving unit which integrally rotates the first conveyor and the second conveyor, a first transporting surface of the first conveyor for transporting a work being disposed to face a second transporting surface of the second conveyor for transporting a work, the first conveyor and the second conveyor being able to hold works regardless of the directions of the first transporting surface and the second transporting surface during the rotation, and the method including:

carrying a work in to the first transporting surface from an upstream side in a transporting direction of the work, carrying a work out from the second transporting surface to a downstream side in the transporting direction, and integrally rotating the first conveyor and the second conveyor to transpose the positions of the first transporting surface and the second transporting surface, and to carry a work out from the first transporting surface to which the work has been carried in immediately before the rotation, to the downstream side in the transporting direction, and to carry a work in to the second transporting surface from the upstream side in the transporting direction.

According to the above work reversing method, the rotary driving unit reverses a work, and one of the first transporting surface and the second transporting surface which are disposed to face each other carries a work in and the other thereof carries a work out, whereby works can be efficiently carried in and carried out. Further, according to the work reversing method, the first transporting surface and the second transporting surface are disposed to face each other, and can hold works respectively, hence the entire apparatus can be downsized.

According to the work reversing apparatus, works can be reversed and carried in and out efficiently. Further, according to the press transporting line, a work processed by the press machine can be efficiently reversed by the work reversing apparatus and transported to the downstream side. Furthermore, according to the work reversing method, works can be reversed and carried in and out efficiently.

Embodiments of the present disclosure are described in detail below with reference to the drawings. Note that the following embodiments do not unduly limit the scope of the invention as stated in the claims. In addition, all of the elements described in connection with the following embodiments should not necessarily be taken as essential requirements of the invention.

1. Press Transporting Line

The press transporting line according to one embodiment of the present disclosure includes: the above mentioned work reversing apparatus; a press machine; an upstream conveyor disposed between the press machine and the work reversing apparatus; and a downstream conveyor disposed on the downstream side of the work reversing apparatus, the upstream conveyor carrying a work processed by the press machine into the work reversing apparatus, and the work reversing apparatus reversing the work and carrying the work out to the downstream conveyor.

Figure 1:
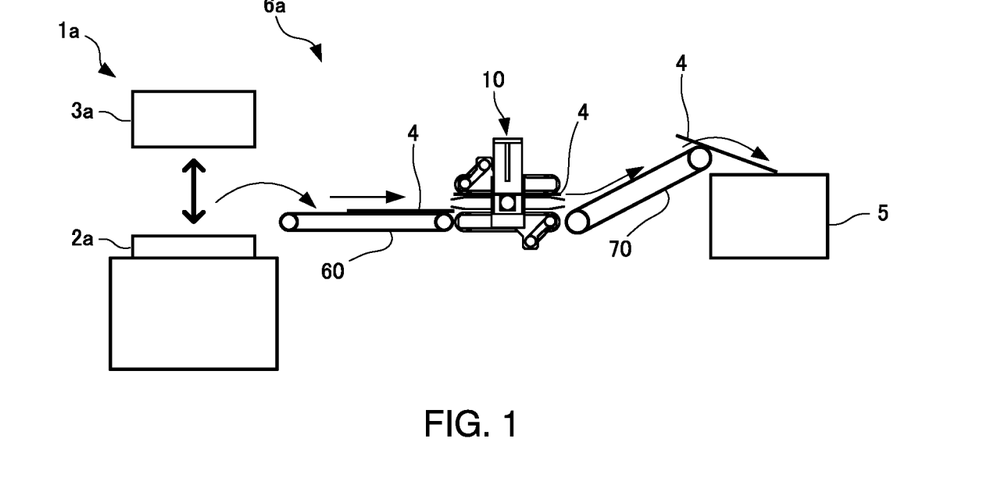
FIG. 1 is a diagram illustrating a configuration of a press transporting line according to one embodiment of the present disclosure.

The press transporting line 6a according to the embodiment will be described in detail with reference to FIG. 1. FIG. 1 is a diagram illustrating a configuration of the transporting line of the press transporting line 6a. In the description, "up" and "down" are directions in the state when the work reversing apparatus 10 or the like is set on the press transporting line 6a, and the "transporting direction" is a direction of moving the work 4 on the press transporting line 6a.

As illustrated in FIG. 1, the press transporting line 6a includes a work reversing apparatus 10, a press machine 1a, an upstream conveyor 60 disposed between the press machine 1a and the work reversing apparatus 10, and a downstream conveyor 70 disposed on the downstream side of the work reversing apparatus 10.

In the press machine 1a, a slide 3a moves up or down from a bolster 2a, so as to press the work 4. The press machine 1a is a known hydraulic press or machine press. The work 4 processed by the press machine 1a is a metal plate material or a processed metal plate product. The press machine performs, for example, shearing, bending, drawing and the like.

The upstream conveyor 60 receives the work 4, pressed by the press machine 1a, from the press machine 1a, and transports the work 4 to the work reversing apparatus 10. The upstream conveyor 60 transports the work 4 along the transporting direction by continuous driving or by intermittent driving. The transporting direction is a direction of transporting the work 4 from the press machine 1a to a container 5. The upstream conveyor 60 is, for example, a belt conveyor which continuously drives an endless belt. The work 4, pressed by the press machine 1a, is transported from the press machine 1a onto the upstream conveyor 60 by an unloading machine (not illustrated).

The work reversing apparatus 10 reverses the work 4 which was carried from the upstream conveyor 60, and then carries the work 4 out to the downstream conveyor 70. The work 4, in the state of being placed on the upstream conveyor 60, is reversed by the work reversing apparatus 10 so that at least the top and bottom surfaces are reversed. The direction of reversing the work by the work reversing apparatus 10 is not especially limited, and may be a desired direction suitable for the direction of the work 4 on the press transporting line 6a. The work reversing apparatus 10 will be described in detail later.

The downstream conveyor 70 is disposed on the downstream side of the work reversing apparatus 10 in the transporting direction of the work 4. The downstream conveyor 70 may have the same configuration as the upstream conveyor 60. The downstream conveyor 70 is disposed in an inclined state from a position lower than the work receiving position of the work reversing apparatus 10 to the container 5 at a position higher than the work supplying position. The downstream conveyor 70 transports the work 4 supplied from the work reversing apparatus 10 to the container 5, and stacks the work 4 up, which is aligned in a predetermined direction, on the containers 5.

According to the press transporting line 6a, the work 4, processed by the press machine 1a, can be efficiently reversed by the work reversing apparatus 10, and transported to the downstream side of the press transporting line 6a.

2. Work Reversing Apparatus

The work reversing apparatus according to one embodiment of the present disclosure includes: a first conveyor that transports a work; a second conveyor that transports a work; and a rotary driving unit that integrally rotates the first conveyor and the second conveyor, a first transporting surface of the first conveyor for transporting a work being disposed to face a second transporting surface of the second conveyor for transporting a work, the first conveyor and the second conveyor being able to hold the work regardless of the directions of the first transporting surface and the second transporting surface during the rotation, and when the rotary driving unit rotates the first conveyor and the second conveyor, the second transporting surface moving to the position where the first transporting surface has been located immediately before the rotation, the first transporting surface moving to the position where the second transporting surface has been located immediately before the rotation, a work being carried in to one of the first conveyor and the second conveyor, and a work being carried out from the other thereof.

Figure 2:
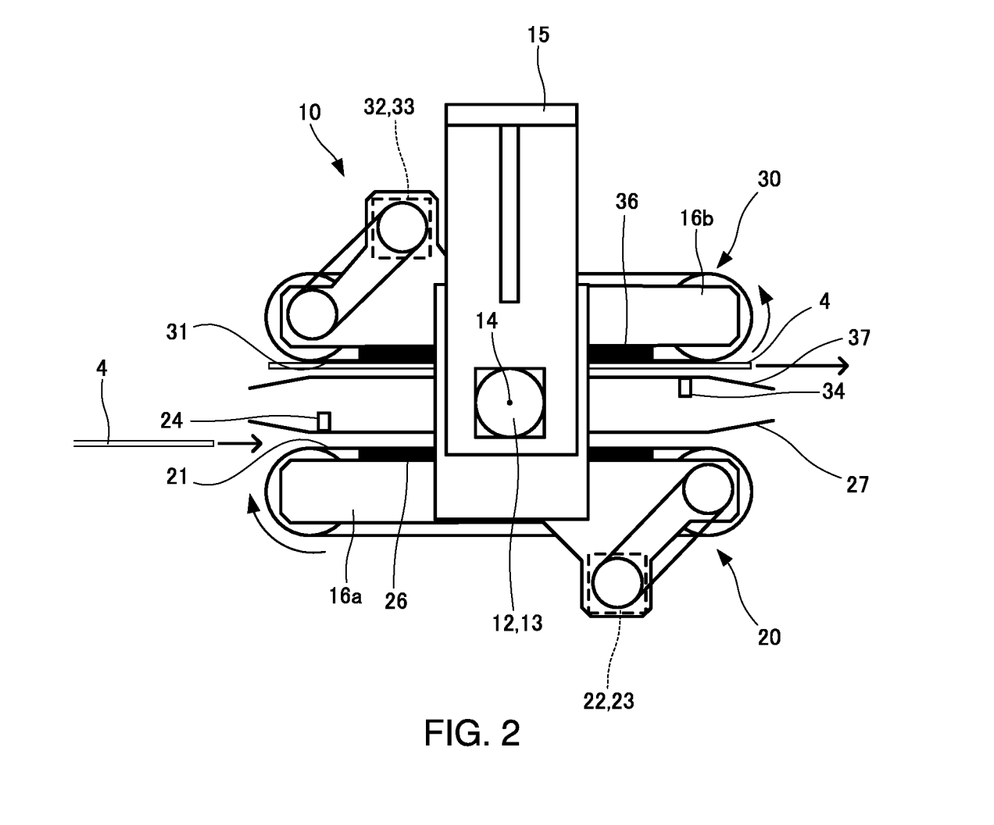
FIG. 2 is a front view of a work reversing apparatus according to one embodiment of the present disclosure.
Figure 3:
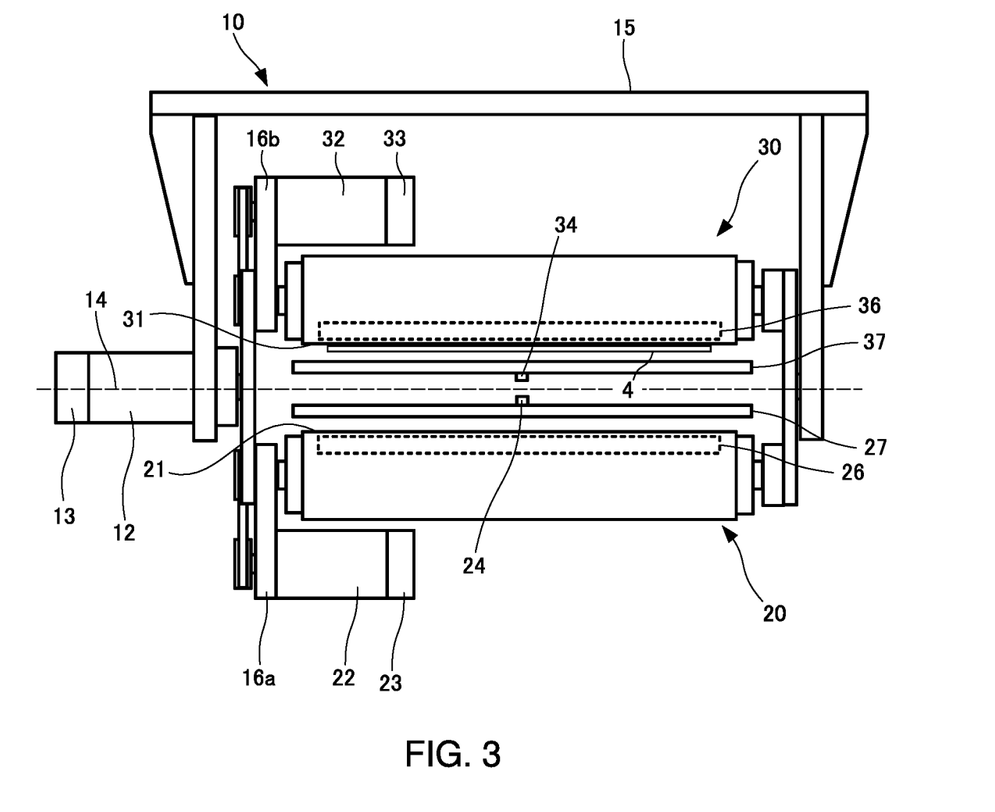
FIG. 3 is a left side view of a work reversing apparatus according to one embodiment of the present disclosure.
Figure 4:
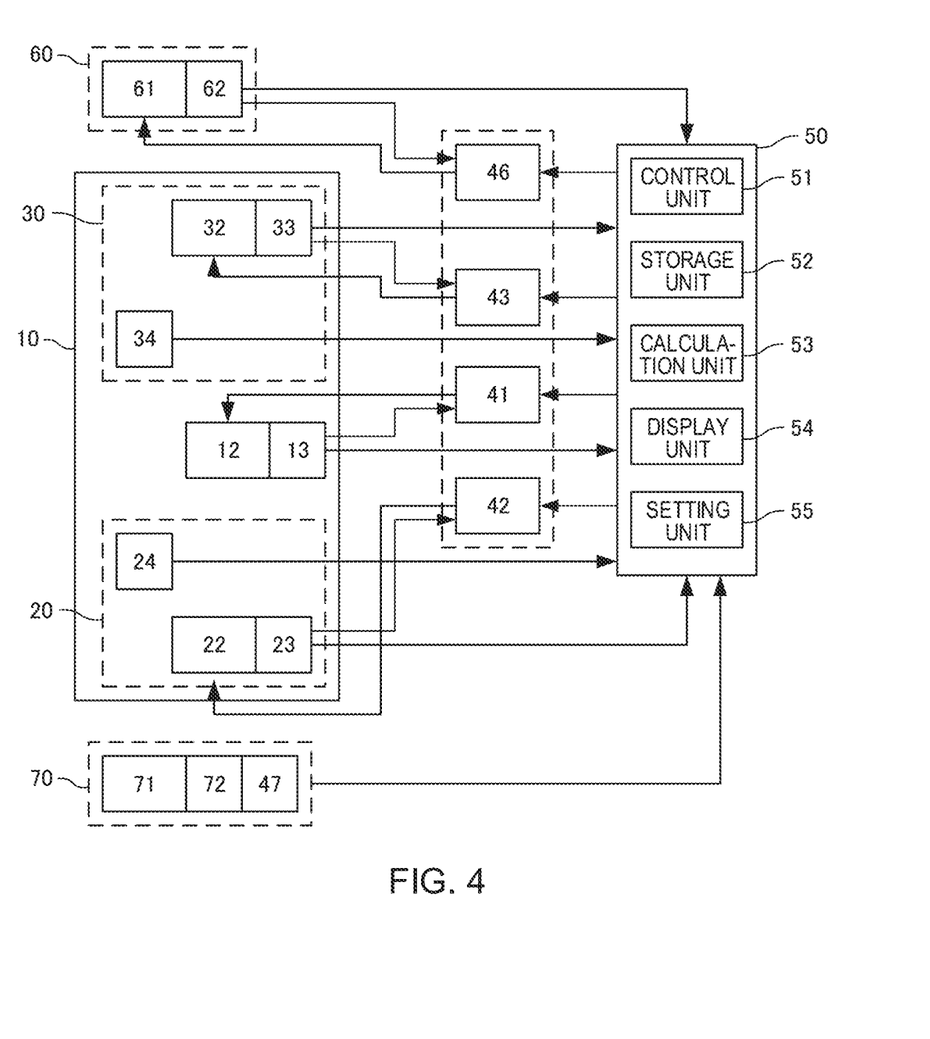
FIG. 4 is a block diagram illustrating a work reversing apparatus according to one embodiment of the present disclosure.

The work reversing apparatus 10 will be described in detail with reference to FIG. 2 to FIG. 4. FIG. 2 is a front view of the work reversing apparatus 10 according to the embodiment, FIG. 3 is a left side view of FIG. 2, and FIG. 4 is a block diagram of the work reversing apparatus 10. In FIG. 2, the work reversing apparatus 10 is illustrated in the same direction as FIG. 1, but the upstream conveyor 60 and the downstream conveyor 70 in FIG. 1 are omitted. In FIG. 2, the transporting direction of the work 4 is from left to right in the drawing.

As illustrated in FIG. 2 to FIG. 4, the work reversing apparatus 10 includes a first conveyor 20 that transports a work 4, a second conveyor 30 that transports the work 4, and a rotary driving unit 12 that integrally rotates the first conveyor 20 and the second conveyor 30. In FIG. 2 to FIG. 4, the first conveyor 20 is on the lower side, and the second conveyor 30 is on the upper side, but the first and second conveyors are vertically reversed and transposed by driving of the rotary driving unit 12.

The first conveyor 20 and the second conveyor 30 are supported by a support unit 15 of the work reversing apparatus 10, so as to be rotatable around the rotation center axis 14. The support unit 15 is supported by a leg portion (not illustrated), and sets the work reversing apparatus 10 at a predetermined height from the installation surface (floor surface of the factory). The support unit 15 includes the rotary driving unit 12 constituted by a servo motor, for example, and thereby the rotary driving unit 12 can rotate rotating plates 16a and 16b around the rotation center axis 14. The rotary driving unit 12 includes a rotating unit encoder 13, and recognizes the rotation positions of the first conveyor 20 and the second conveyor 30 by detecting the rotation amount of the servo motor.

The configuration of the first conveyor 20 and that of the second conveyor 30 are essentially the same. A first transporting surface 21 of the first conveyor 20 to transport the work 4 and a second transporting surface 31 of the second conveyor 30 to transport the work 4 are disposed to face each other. The first transporting surface 21 of the first conveyor 20 and the second transporting surface 31 of the second conveyor 30 are surfaces on which the work 4 is held respectively. If the first conveyor 20 and the second conveyor 30 are belt types, the first transporting surface 21 and the second transporting surface 31 are surfaces of the belts where the work 4 contacts and is held.

The first conveyor 20 is a belt conveyor which rotates an endless belt in the transporting direction of the work 4, and includes: a first motor 22 which is an electric motor to rotate the belt that wound around a set of rollers disposed on both ends in the transporting direction; a first encoder 23 which detects the rotation amount, the rotation speed and the rotation direction of the first motor 22; and the first detector 24. A servo motor may be used for the first motor 22.

The second conveyor 30 has the same configuration as the first conveyor 20, and includes a second motor 32, a second encoder 33 and a second detector 34.

The first conveyor 20 and the second conveyor 30 are not limited to the belt conveyors, but may have different configurations which can transport the pressed work 4. For example, in the case of using an endless chains, the chains may be wound around two sets of sprockets, or a linear transporting mechanism, including a linear motion type reciprocating driving mechanism (e.g. ball screw mechanism, pneumatic cylinder), may be used.

The first conveyor 20 and the second conveyor 30 can hold the work 4 regardless which directions the first transporting surface 21 and the second transporting surface 31 face are directed during rotation. Therefore in the state of FIG. 2 and FIG. 3, the work 4 can be held on the first transporting surface 21 and under the second transporting surface 31.

The first conveyor 20 includes a first holding unit that holds a work 4 on the first transporting surface 21, and a first guide 27 provided between the first transporting surface 21 and the second transporting surface 31, and extending in a direction parallel with the first and second transporting surfaces 21 and 31. The second conveyor 30 includes a second holding unit that holds a work 4 on the second transporting surface 31, and a second guide 37 provided between the second transporting surface 31 and the first transporting surface 21, and extending in a direction parallel with the first and second transporting surfaces 21 and 31. By disposing the first guide 27 and the second guide 37 in a direction parallel with the first transporting surface 21 and the second transporting surface 31, dropping a work 4 located distant from the holding units can be prevented.

For the first holding unit, a first magnet 26 may be disposed on the back side of the belt located at the first transporting surface 21. For the second holding unit, a second magnet 36 may be disposed on the back side of the belt located at the second transporting surface 31. The first magnet 26 attracts and holds the work 4 located on the first transporting surface 21 of the belt. The second magnet 36 attracts and holds the work 4 located on the second transporting surface 31 of the belt. Even if the belt of the first conveyor 20 is moved by the driving of the first motor 22, the work 4 can be moved in the transporting direction, and the work 4 can continue to adhere to the first transporting surface 21, even during rotation by the rotary driving unit 12. Even if the belt of the second conveyor 30 is moved by the driving of the second motor 32, the work 4 can be moved in the transporting direction, and the work 4 can continue to adhere to the second transporting surface 31, even during rotation by the rotary driving unit 12.

The first holding unit and the second holding unit are not limited to magnets, but may be a different mechanism as long as the work 4 can be held during rotation. For example, as a mechanism to hold the work 4, a suction type conveyor, in which the belt has many holes for vacuuming, may be used, or a mechanism to mechanically hold the work 4 may be used.

The first guide 27 and the second guide 37 are longer than the first transporting surface 21 and the second transporting surface 31 respectively in the transporting direction and also in the direction perpendicular to the transporting direction. This is to prevent dropping of the work 4 with certainty.

When the rotary driving unit 12 rotates the first conveyor 20 and the second conveyor 30, the second transporting surface 31 moves to the position where the first transporting surface 21 has been located immediately before the rotation, and the first transporting surface 21 moves to the position where the second transporting surface 31 has been located immediately before the rotation, and the work 4 is carried in to one of the first conveyor 20 and the second conveyor 30, and the work 4 is carried out from the other thereof. According to this embodiment, the work 4 is carried in on the lower side of the rotary driving unit 12, and is carried out on the upper side thereof. When the rotary driving unit 12 reverses the work 4, the work 4 is carried in to one of the first transporting surface 21 and the second transporting surface 31, which are disposed to face each other, and is carried out from the other thereof, whereby the work 4 can be efficiently carried in and carried out. Further, the first transporting surface 21 and the second transporting surface 31 are disposed to face each other, and can hold the work 4 respectively, hence the entire apparatus can be downsized.

The rotary driving unit 12 rotates the first conveyor 20 and the second conveyor 30 around the rotation center axis 14 that extends in a direction perpendicular to the transporting directions of the work 4 on the first conveyor 20 and the second conveyor 30. By driving the rotary driving unit 12, the work 4 can be reversed around the rotation center axis 14 that extends in a direction perpendicular to the transporting direction. The rotation center axis 14 is at a mid-point between the first conveyor 20 and the second conveyor 30, and at the center of the length between the first conveyor 20 and the second conveyor 30 in the transporting direction. The rotation center axis 14 extends in a direction perpendicular to the transporting direction when the work 4 is transported on the first conveyor 20 and the second conveyor 30, and is on the horizontal plane. Therefore the turning radius of the first conveyor 20 and the second conveyor 30 can be decreased, and the work reversing apparatus 10 can be downsized.

The work reversing apparatus 10 includes: the first detector 24 that detects the entry of the work 4 into the first transporting surface 21; the second detector 34 that detects the entry of the work 4 into the second transporting surface 31; and a controller 50 that receives signals from the first detector 24 and the second detector 34, and controls the driving of the rotary driving unit 12.

The first detector 24 and the second detector 34 essentially have the same functions. The first detector 24 and the second detector 34 are fixed near the entrance of the receiving side conveyor in the transporting direction of the first guide 27 and the second guide 37 respectively, and can detect the entry of the work 4 into the entrance without contacting the work 4. Known proximity switches can be used for the first detector 24 and the second detector 34. The proximity switch is not limited to a non-contact type, but may be a contact type, and a known conventional switch can be used. The specific functions of the first detectors 24 and the second detectors 34 will be described in "3. Work Reversing Method".

As illustrated in FIG. 4, the work reversing apparatus 10 has the controller 50. The controller 50 includes a control unit 51 that controls each driving unit of the work reversing apparatus 10, a storage unit 52 that stores a control program and the like, and a calculation unit 53 that receives a signal from each detector, and performs various calculations based on the control program. The controller 50 may further includes a display unit 54 that displays a setup screen and the like, and a setting unit 55 that performs operation settings.

The controller 50 receives signals from the rotating unit encoder 13, the first encoder 23, the first detector 24, the second encoder 33, the second detector 34, and an upstream encoder 62, and outputs signals to a rotary motor driver 41, a first motor driver 42, a second motor driver 43 and an upstream motor driver 46, and controls the driving of the rotary driving unit 12, the first motor 22, the second motor 32 and an upstream motor 61.

The controller 50 also receives signals from the downstream conveyor 70 which includes a downstream motor 71, a downstream encoder 72 and a downstream motor driver 47, and controls the upstream conveyor 60 and the work reversing apparatus 10.

The controller 50 confirms, using the first detector 24, that the work 4, of which the entry to the first transporting surface 21 is detected, is carried in from the upstream side in the transporting direction of the work 4, to a predetermined position on the first transporting surface 21, and that the work 4 is carried out from the second conveyor 30, and no longer exists on the second transporting surface 31, then the controller 50 rotates the first conveyor 20 and the second conveyor 30 by driving of the rotary driving unit 12. In the state where the second transporting surface 31 is moved to the position at which the first transporting surface 21 is located immediately before rotation, the controller 50 confirms, using the second detector 34, that the work 4, of which entry to the second transporting surface 31 is detected, is carried in from the upstream side in the transporting direction of the work 4, to a predetermined position on the second transporting surface 31, and that the work 4 is carried out from the first conveyor 20, and no longer exists on the first transporting surface 21, then the controller 50 rotates the second conveyor 30 and the first conveyor 20 by driving the rotary driving unit 12. By confirming the position of the work 4 on each transporting surface 21 and 31 like this, the controller 50 can determine whether the first conveyor 20 and the second conveyor 30 can be rotated. When it is determined that the rotation is possible, the controller 50 turns (rotates) the first conveyor 20 and the second conveyor 30 around the rotation center axis 14 while continuously holding the work 4. In concrete terms, when the first detector 24 detects entry of the work 4, the controller 50 outputs a signal to the first motor 22 so as to rotate for a predetermined number of times. The predetermined number of times is set in advance to a number by which the work 4 can move to a position where the work 4 does not interfere with another component even if the first conveyor 20 rotates. The first encoder 23 is disposed in the first motor 22, and the controller 50 confirms that the first motor 22 rotates for a predetermined number of times based on the output from the encoder 23. Since the work 4, is carried in to the predetermined position on the first transporting surface 21 if the first motor 22 rotates for a predetermined number of times, the controller 50 confirms that the work 4 has been carried in to the predetermined position on the first transporting surface 21 based on the output from the first encoder 23. For the second conveyor 30 as well, the controller 50 can execute the same processing as for the first conveyor 20.

3. Work Reversing Method

A work reversing method according to one embodiment of the present disclosure is a work reversing method using a work reversing apparatus that includes: a first conveyor that transports a work; a second conveyor that transports a work; and a rotary driving unit that integrally rotates the first conveyor and the second conveyor, a first transporting surface of the first conveyor for transporting a work being disposed to face a second transporting surface of the second conveyor for transporting a work, the first conveyor and the second conveyor being able to hold works regardless of the directions of the first transporting surface and the second transporting surface during the rotation, and the method including: carrying a work in to the first transporting surface from an upstream side in a transporting direction of the work, and carrying a work out from the second transporting surface to a downstream side in the transporting direction; and integrally rotating the first conveyor and the second conveyor to transpose the positions of the first transporting surface and the second transporting surface, and to carry a work out from the first transporting surface to which the work was carried in immediately before the rotation, to the downstream side in the transporting direction, and to carry a work in to the second transporting surface from the upstream side in the transporting direction.

Figure 5:
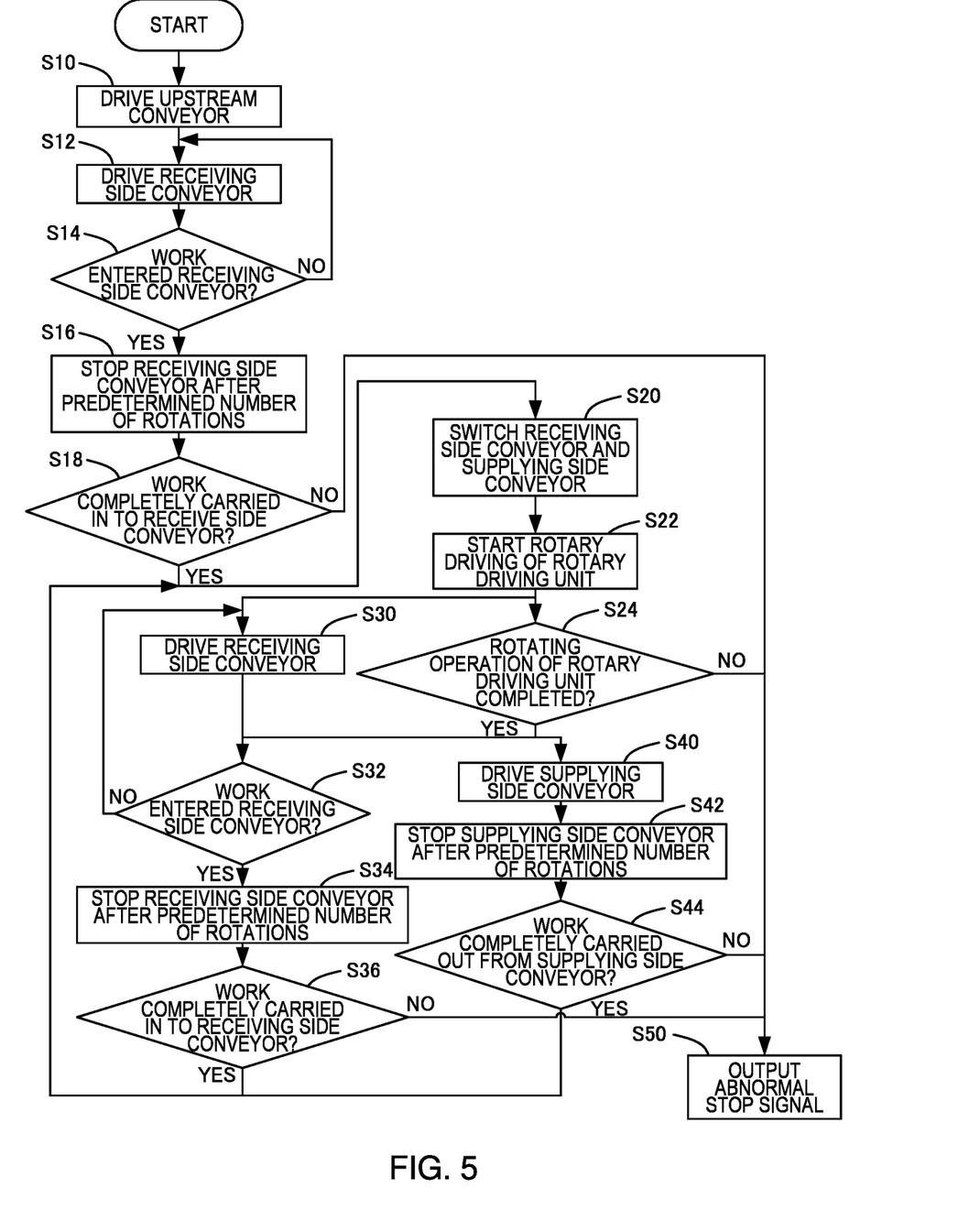
FIG. 5 is a flow chart illustrating a work reversing method according to the embodiment of the present disclosure.
Figure 6:
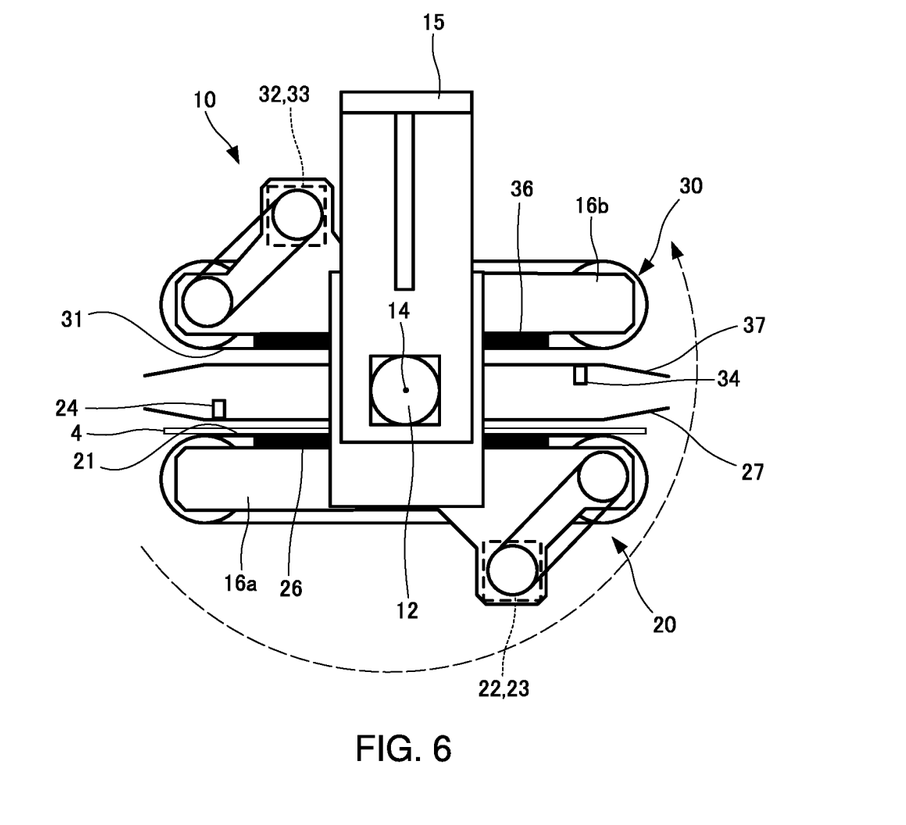
FIG. 6 is a diagram illustrating an operation of a work reversing apparatus in a work reversing method according to one embodiment of the present disclosure.
Figure 7:
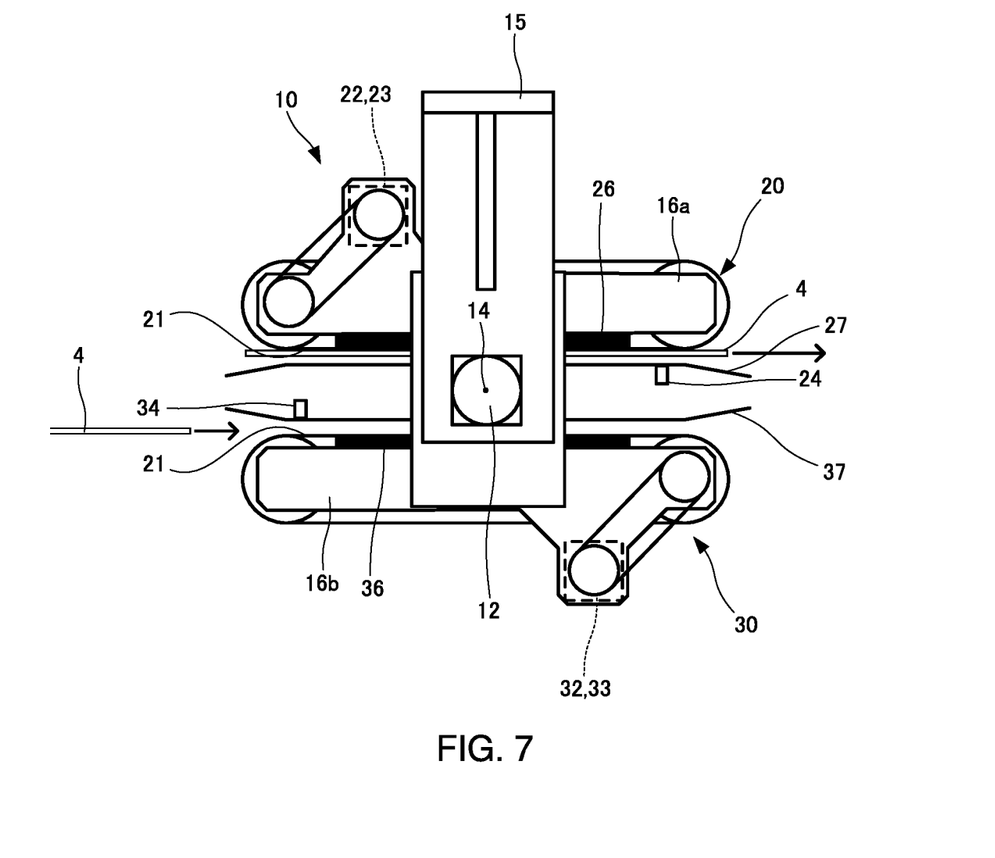
FIG. 7 is a diagram illustrating an operation of a work reversing apparatus in a work reversing method according to one embodiment of the present disclosure.
Figure 8:
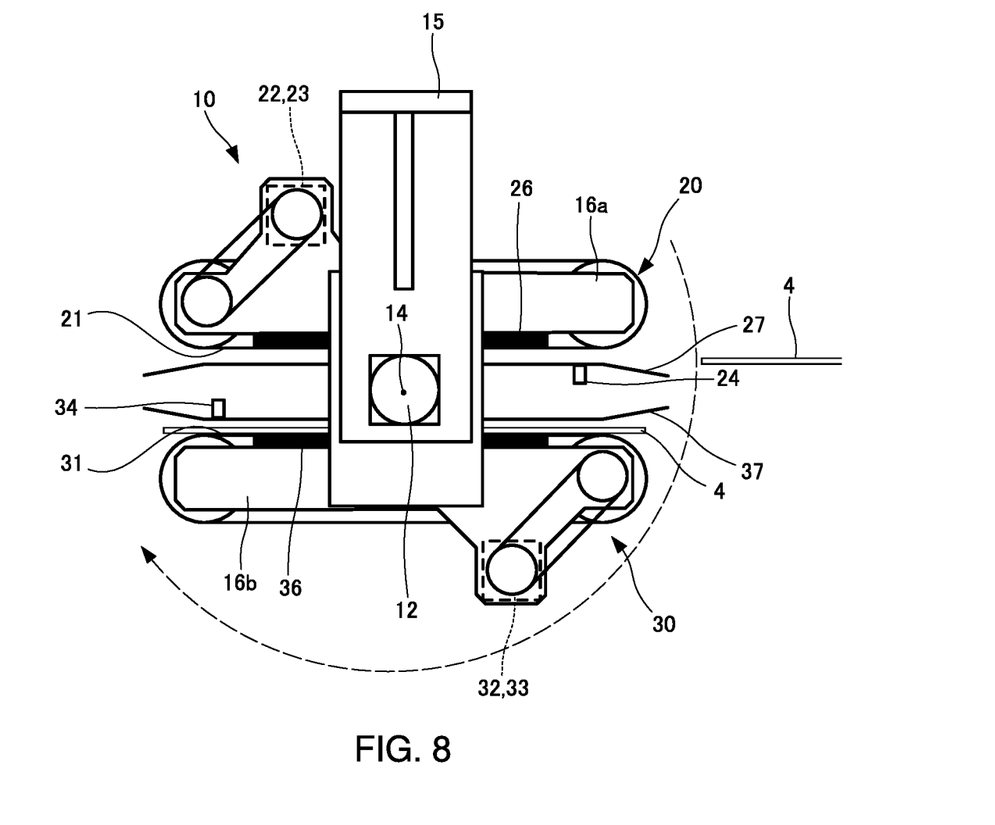
FIG. 8 is a diagram illustrating an operation of a work reversing apparatus in a work reversing method according to one embodiment of the present disclosure.

The work reversing method will be described with reference to FIG. 1 to FIG. 8. FIG. 5 is a flow chart illustrating the work reversing method according to one embodiment of the present disclosure, and FIG. 6 to FIG. 8 are diagrams illustrating the operation of the work reversing apparatus based on the work reversing method according to one embodiment of the present disclosure. The series of operations from the state in FIG. 2 to the state in FIG. 8 will be described with reference to FIG. 2 and FIG. 6 to FIG. 8.

When the press transporting line 6a starts production, the work reversing apparatus 10 starts operation.

S10: The controller 50 drives the upstream conveyor 60. The control unit (not illustrated) of the press transporting line 6a drives the downstream conveyor 70. At this point, the press machine 1a starts pressing the work 4, and the processed work 4 is sequentially transferred to the upstream conveyor 60.

S12: The controller 50 drives the receiving side conveyor (first conveyor 20 in FIG. 2). The upstream conveyor 60 is continuously operated, and the processed work 4 enters the first conveyor 20.

S14: The controller 50 confirms whether the work 4 has entered the receiving side conveyor (first conveyor 20). If the work 4 has entered the first conveyor 20, the first detector 24, installed in the upstream conveyor 60 side, outputs a signal indicating detection of the entry of the work 4 to the controller 50 to execute S16.

S16: The controller 50 stops the receiving side conveyor (first conveyor 20) when the first motor 22 rotates for a predetermined number of times after the first detector 24 detected the entry of the work 4 into the conveyor 20. If there is no operation failure after rotating the first motor 22 for a predetermined number of times, the work 4 is disposed at a predetermined position on the first transporting surface 21.

S18: The controller 50 confirms whether the work 4 was completed carried in to the receiving side conveyor (first conveyor 20). For example, the controller 50 confirms that the first encoder 23 outputs that the first motor 22 rotated for a predetermined number of times, whereby the controller 50 confirms that the work 4 is disposed at a predetermined position on the first transporting surface 21, and then the controller 50 executes S20.

S20: The controller 50 switches the receiving side conveyor (first conveyor 20) and the supplying side conveyor (second conveyor 30 in FIG. 2). The receiving side conveyor and the supplying side conveyor are phrases used for convenience to describe the operation, hence the controller 50 recognizes the first conveyor 20 as the supplying side conveyor, and the second conveyor 30 as the receiving side conveyor.

S22: As illustrated in FIG. 6, the controller 50 starts rotary driving of the rotary driving unit 12. The first conveyor 20 and the second conveyor 30 rotate 180° counterclockwise around the rotation center axis 14, for example. During this time, the work 4 rotates in a state of being attracted and contacted to the first transporting surface 21 by the magnetic force of the first magnet 26. Since the controller 50 has confirmed that the work 4 is at a predetermined position on the first transporting surface 21, based on the output of the first encoder 23, the rotation operation can be performed without interfering with other components. After executing the processing in S22, the controller 50 executes the processing in S24, and executes the processing in S30 in the receiving side conveyor (second conveyor 30).

S24: The controller 50 determines whether the rotating operation of the rotary driving unit 12 has completed or not, based on the output of the rotating unit encoder 13. If the rotating operation has completed, the controller 50 executes S32 and S40.

S30: As illustrated in FIG. 7, the controller 50 drives the receiving side conveyor (second conveyor 30). In FIG. 7, the work 4 is illustrated to clearly indicate the transporting direction of the work 4, but in reality, the work 4 does not exist on the second conveyor 30 since this is immediately after starting production. The driving start timing of the receiving side conveyor may occur immediately after the start of rotation, but may be after the rotation completes, for example.

S32 to S36: The controller 50 executes the processing in S32 to S36, and if S36 is "YES", the controller 50 returns to S20, and repeats processing. The operation in the processing in S32 to S36 is the same as the operation in S14 to S18 (the functions of the first detector 24 and the second detectors 34 are also the same), except that the receiving side conveyor is changed from the first conveyor 20 to the second conveyor 30, hence description of the processing in S32 to S36 is omitted.

S40: As illustrated in FIG. 8, the controller 50 drives the supplying side conveyor (first conveyor 20). The work 4 exists on the first transporting surface 21 of the first conveyor 20, hence the work 4 is carried out to the downstream conveyor 70 by driving the first conveyor 20. During this carrying out as well, the work 4 moves in a state of being attracted and contacted to the first transporting surface 21 by the magnetic force of the first magnet 26, and when the magnetic force of the first magnet 26 weakens, the work 4 is released from the first transporting surface 21, and is transferred onto the downstream conveyor 70.

S42: The controller 50 stops the supplying side conveyor (first conveyor 20) after a predetermined number of rotations. The predetermined number of rotations is set to a number by which the work 4 can be transferred from the first conveyor 20 to the downstream conveyor 70 with certainty. A detector, to detect that carrying out of the work 4 from the supplying side conveyor (first conveyor 20) has completed, may be disposed in the downstream conveyor 70.

S44: The controller 50 determines whether the carrying out of the work 4 from the supplying side conveyor (first conveyor 20) has completed or not. For example, if the controller 50 confirms, by the output of the first encoder 23, that the motor of the supplying side conveyor (first motor 22) rotated a predetermined number of times, the controller 50 recognizes that the carrying out of the work 4 has completed, returns to S20, and repeats the same processing.

S50: When the determination processing in S18, S36 or S44 results in "NO", the controller 50 outputs an abnormality stop signal. Based on this signal, the controller 50 stops all operations.

Therefore according to this work reversing method, the controller 50 executes the processing in S20 to S24 and S30, and carries the work 4 in to the first transporting surface 21 from the upstream side in the transporting direction of the work 4 in S32 to S36, as illustrated in FIG. 2, and carries the work 4 out from the second transporting surface 31 to the downstream side in the transporting direction in S40 to S44. By integrally rotating the first conveyor 20 and the second conveyor 30 in S20 to S24, as illustrated in FIG. 6, the positions of the first transporting surface 21 and the second transporting surface 31 are transposed, and, as illustrated in FIG. 7, the work 4 is carried out from the first transporting surface 21, to which the work 4 was carried in immediately before the rotation, to the downstream side in the transporting direction, and the work 4 is carried in to the second transporting surface 31 from the upstream side in the transporting direction. According to this method, the work 4 is reversed by the rotary driving unit 12, and the work 4 is carried in to one of the first transporting surface 21 and the second transporting surface 31, which are disposed to face each other, and the work 4 is carried out from the other thereof, therefore the work 4 can be carried in and carried out efficiently. Further, the first transporting surface 21 and the second transporting surface 31 are disposed to face each other, and can hold the work 4 respectively, hence the entire work reversing apparatus 10 can be downsized.

4. Modification 1

Figure 9:
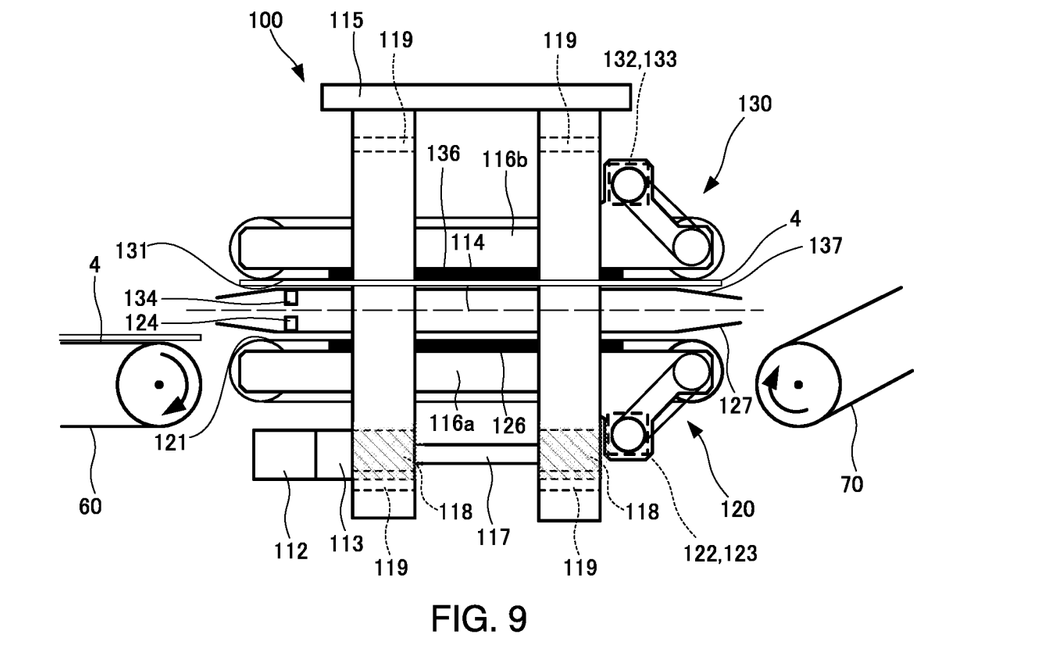
FIG. 9 is a front view of a work reversing apparatus according to Modification 1.

A work reversing apparatus 100 according to Modification 1 will be described with reference to FIG. 9 and FIG. 10. FIG. 9 is a front view of the work reversing apparatus 100 according to Modification 1, and FIG. 10 is a right side view of the work reversing apparatus 100 according to Modification 1.

Figure 10:
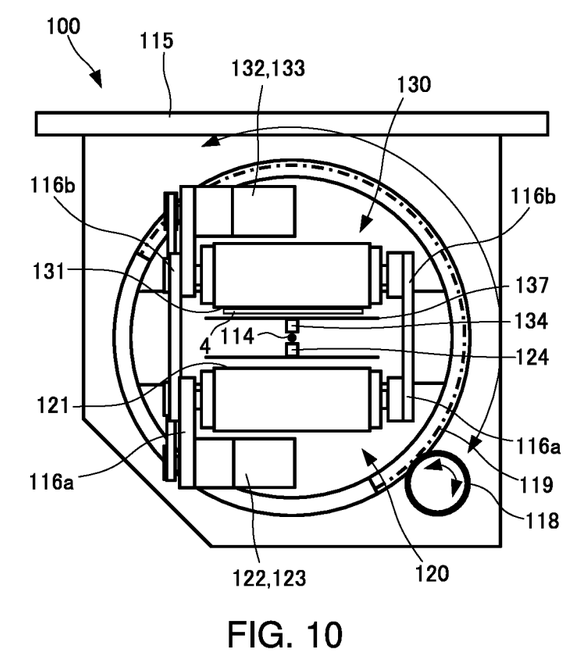
FIG. 10 is a right side view of the work reversing apparatus according to Modification 1.

As illustrated in FIG. 9 and FIG. 10, the work reversing apparatus 100 has the same basic configuration as the work reversing apparatus 10, hence the work reversing apparatus 100 may be installed in the press transporting line 6a, instead of the work reversing apparatus 10. In what follows, redundant description on the configuration that is the same as the work reversing apparatus 10 is omitted.

The work reversing apparatus 100 includes: a first conveyor 120 that transports a work 4; a second conveyor 130 that transports the work 4; and a rotary driving unit 112 that integrally rotates the first conveyor 120 and the second conveyor 130.

Similarly to the first conveyor 20, the first conveyor 120 includes a first transporting surface 121, a first motor 122, a first encoder 123, a first detector 124, a first magnet 126 and a first guide 127. Further, similarly to the second conveyor 30, the second conveyor 130 includes a second transporting surface 131, a second motor 132, a second encoder 133, a second detector 134, a second magnet 136 and a second guide 137.

The first conveyor 120 and the second conveyor 130 are supported by a support unit 115 of the work reversing apparatus 100, so as to rotate around a rotation center axis 114.

In the work reversing apparatus 100, the rotary driving unit 112 rotates the first conveyor 120 and the second conveyor 130 around the rotation center axis 114 that extends in a direction parallel with the transporting directions of the work 4 on the first conveyor 120 and the second conveyor 130. The rotation center axis 114 is parallel with the transporting direction when the work 4 is transported on the first conveyor 120 or the second conveyor 130, and is on the horizontal plane. Therefore the work 4 can be reversed around the rotation center axis 114, which is parallel with the transporting direction.

In the support unit 115, rotating plates 116a and 116b, which rotate with the first conveyor 120 and the second conveyor 130 in a through hole of the support unit 115, are disposed respectively, and a gear 119 is disposed on the outer periphery of the rotating plates 116a and 116b. A gear 118 (shaded portion in FIG. 9), which engages with this gear 119, can be rotated by the rotary driving unit 112, and by the rotation of the gear 118, the gear 119 and the rotating plates 116a and 116b are rotated with respect to the support unit 115.

The rotation center axis 114 extends in a direction parallel with the transporting direction of the work 4, hence the direction of the work 4 after being reversed is different from the direction of the work 4 in the work reversing apparatus 10.

A set of gears 118 and 119 is disposed at two locations for the support unit 115, and the two gears 118 are linked by an equalizing shaft 117, and rotate synchronously.

In the state indicated in FIG. 9, the work reversing apparatus 100 carries the work 4 to the first transporting surface 121 of the first conveyor 120 from the upstream conveyor 60, and carries the work 4 out from the second transporting surface 131 of the second conveyor 130 to the downstream conveyor 70. The first transporting surface 121 and the second transporting surface 131 can attract the work 4 by the first magnet 126 and the second magnet 136, whereby dropping of the work 4 can be prevented during the rotation operation.

By the driving of the rotary driving unit 112, the first conveyor 120 and the second conveyor 130 are integrally rotated, whereby the positions of the first transporting surface 121 and the second transporting surface 131 are transposed, and the work 4 is carried out from the first transporting surface 121, to which the work 4 was carried in immediately before the rotation, to the downstream conveyor 70, and the work 4 is carried in to the second transporting surface 131 from the upstream conveyor 60, although here illustration thereof is omitted. In this way, the work 4 is reversed by the rotary driving unit 112, and the work 4 is carried in to one of the first transporting surface 121 and the second transporting surface 131, which are disposed to face each other, and the work 4 is carried out from the other thereof, therefore the work 4 can be carried in and carried out efficiently.

The rotation center axis 114 is at the mid-point between the first transporting surface 121 and the second transporting surface 131, and is at the center between the first transporting surface 121 and the second transporting surface 131 in the width direction. Therefore the turning radius of the first conveyor 120 and the second conveyor 130 can be decreased, and the work reversing apparatus 100 can be downsized.

Even if the positions of the first conveyor 120 and the second conveyor 130 are transposed by the driving of the rotary driving unit 112, the rotating directions of the first motor 122 and the second motor 132 (rotating direction of the belt) are always the same.

Similarly to the work reversing apparatus 10, the work reversing apparatus 100 operates in accordance with the flow chart in FIG. 5.

5. Modification 2

Figure 11:
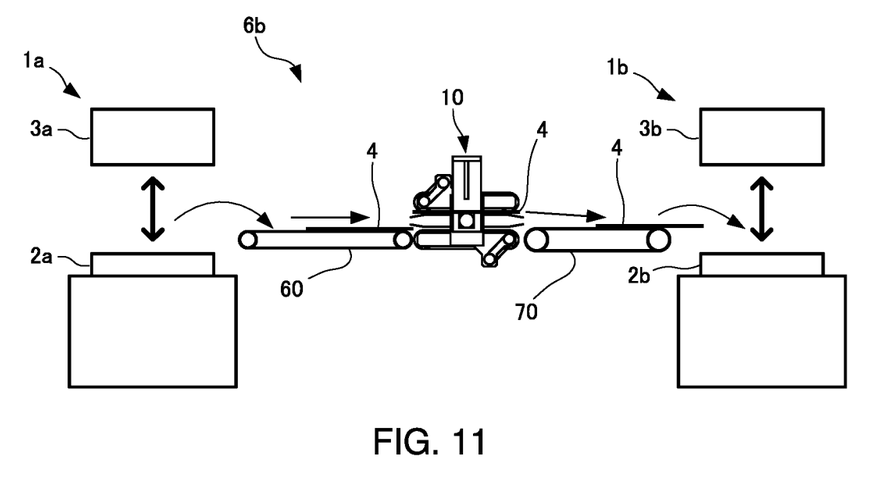
FIG. 11 is a diagram illustrating a configuration of a transporting line according to Modification 2 in which a work reversing apparatus according to one embodiment of the present disclosure is installed in a press transporting line.

A press transporting line 6b, according to Modification 2, will be described in detail with reference to FIG. 11.

A difference of the press transporting line 6b illustrated in FIG. 11 from the press transporting line 6a described with reference to FIG. 1 is that the press machine 1b is disposed at a position of the container 5 in the press transporting line 6a.

The press transporting line 6b includes the work reversing apparatus 10, the press machine 1a, the upstream conveyor 60 disposed between the press machine 1a and the work reversing apparatus 10, and the downstream conveyor 70 disposed on the downstream side of the work reversing apparatus 10. The above mentioned work reversing apparatus 100 may be used instead of the work reversing apparatus 10.

A press machine 1b includes a bolster 2b and a slide 3b, similarly to the press machine 1a, and performs post-processing of the work 4 processed by the press machine 1a.

The work 4 processed by the press machine 1a is carried in to the work reversing apparatus 10 by the upstream conveyor 60, is reversed by the work reversing apparatus 10, and is then carried out to the downstream conveyor 70. According to the press transporting line 6b, the work 4, processed by the press machine 1a, can be efficiently reversed by the work reversing apparatus 10, and transported to the press machine 1b located at the downstream side of the press transporting line 6b.

Note that the invention is not limited to the embodiments thereof described above and thus it can be implemented in many various ways. The invention includes various other configurations that are substantially the same (for example, in function, method, and results, or in objective and effects) as the configurations described in the embodiments. The invention also includes various other configurations in which non-essential elements described in the embodiments are replaced by other elements. The invention also includes various other configurations having the same effects as those of the configurations described in the embodiments, or various other configurations capable of achieving the same objectives as those of the configurations described in the embodiments. Furthermore, the invention includes various other configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

REFERENCE SIGNS LIST

1a & 1b: Press machine, 2a & 2b: Bolster, 3a & 3b: Slide, 4: Work, 5: Container,
6a & 6b: Press transporting line, 10 & 100: Work reversing apparatus,
12 & 112: Rotary driving unit, 13 & 113: Rotating unit encoder,
14 & 114: Rotation center axis, 15 & 115: Support unit,
16a, 16b, 116a & 116b: Rotating plate, 117: Equalizing shaft, 118 & 119: Gear,
20 & 120: First conveyor, 21 & 121: First transporting surface, 22 & 122: First motor,
23 & 123: First encoder, 24 & 124: First detector, 26 & 126: First magnet,
27 & 127: First guide, 30 & 130: Second conveyor,
31 & 131: Second transporting surface, 32 & 132: Second motor,
33 & 133: Second encoder, 34 & 134: Second detector, 36 & 136: Second magnet,
37 & 137: Second guide, 41: Rotary motor driver, 42: First motor driver,
43: Second motor driver, 46: Upstream motor driver, 47: Downstream motor driver,
50: Controller, 51: Control unit, 52: Storage unit, 53: Calculation unit, 54: Display unit,
55: Setting unit, 60: Upstream conveyor, 61: Upstream motor, 62: Upstream encoder,
70: Downstream conveyor, 71: Downstream motor, 72: Downstream encoder

The invention claimed is:

1. A work reversing apparatus comprising:
a first conveyor having a first transporting surface which transports a work;
a second conveyor having a second transporting surface which transports a work;
a first holding unit which holds a work on the first transporting surface;
a second holding unit which holds a work on the second transporting surface; and
a rotary driving unit which integrally rotates the first conveyor and the second conveyor,
the first holding unit being able to hold a work on the first transporting surface independently from the second holding unit,
the second holding unit being able to hold a work on the second transporting surface independently from the first holding unit,
the first transporting surface being disposed to face the second transporting surface,
the first transporting surface and the second transporting surface being able to hold works regardless of the directions of the first conveyor and the second conveyor during the rotation, and
when the rotary driving unit rotates the first conveyor and the second conveyor, the second transporting surface moving to a position where the first transporting surface has been located immediately before the rotation, the first transporting surface moving to a position where the second transporting surface has been located immediately before the rotation, a work being carried out, immediately after the rotation, to a downstream side in a transporting direction of the work from one of the first transporting surface and the second transporting surface to which the work has been carried in from an upstream side in the transporting direction immediately before the rotation, and a work being carried in, immediately after the rotation, from the upstream side in the transporting direction to the other transporting surface from which a work has been carried out to the downstream side in the transporting direction immediately before the rotation.

2. The work reversing apparatus according to claim 1,
wherein the rotary driving unit rotates the first conveyor and the second conveyor around a rotation center axis that extends in a direction perpendicular to a transporting direction of works on the first conveyor and the second conveyor.

3. The work reversing apparatus according to claim 1,
wherein the rotary driving unit rotates the first conveyor and the second conveyor around a rotation center axis that extends in a direction parallel with a transporting direction of works on the first conveyor and the second conveyor.

4. The work reversing apparatus according to claim 1, further comprising:
a first detector which detects entry of a work into the first transporting surface;
a second detector which detects entry of a work into the second transporting surface; and
a controller which receives signals from the first detector and the second detector, and controls driving of the rotary driving unit,
wherein the controller drives the rotary driving unit and rotates the first conveyor and the second conveyor after confirming that a work whose entry into the first transporting surface is detected by the first detector is carried in to a predetermined position on the first transporting surface from an upstream side in a transporting direction of the work, and confirming that a work is carried out from the second conveyor and no longer exists on the second transporting surface, and
in a state that the second transporting surface is moved to the position where the first transporting surface has been located immediately before the rotation, the controller drives the rotary driving unit and rotates the second conveyor and the first conveyor after confirming that a work whose entry into the second transporting surface is detected by the second detector is carried in to a predetermined position on the second transporting surface from the upstream side in the transporting direction of the work, and confirming that a work is carried out from the first conveyor and no longer exists on the first transporting surface.

5. The work reversing apparatus according to claim 1,
wherein the first conveyor includes a first guide provided between the first and second transporting surfaces and extending in a direction parallel with the first transporting surface and the second transporting surface, and
the second conveyor includes a second guide provided between the second transporting surface and the first transporting surface and extending in a direction parallel with the second and first transporting surfaces.

6. A press transporting line comprising:
the work reversing apparatus according to claim 1;
a press machine;
an upstream conveyor disposed between the press machine and the work reversing apparatus; and
a downstream conveyor disposed on a downstream side of the work reversing apparatus,
the upstream conveyor carrying a work processed by the press machine into the work reversing apparatus, and the work reversing apparatus reversing the work and carrying the work out to the downstream conveyor.

7. A work reversing method using a work reversing apparatus that includes:
a first conveyor having a first transporting surface which transports a work;
a second conveyor having a second transporting surface which transports a work;
a first holding unit which holds a work on the first transporting surface;
a second holding unit which holds a work on the second transporting surface; and
a rotary driving unit which integrally rotates the first conveyor and the second conveyor,
the first holding unit being able to hold a work on the first transporting surface independently from the second holding unit,
the second holding unit being able to hold a work on the second transporting surface independently from the first holding unit,
the first transporting surface being disposed to face the second transporting surface,
the first transporting surface and the second transporting surface being able to hold works regardless of the directions of the first conveyor and the second conveyor during the rotation, and
the method comprising:
integrally rotating the first conveyor and the second conveyor to transpose the positions of the first transporting surface and the second transporting surface, and to carry a work out, immediately after the rotation, to a downstream side in a transporting direction of the work from one of the first transporting surface and the second transporting surface to which the work has been carried in from an upstream side in the transporting direction immediately before the rotation, and to carry a work in, immediately after the rotation, from the upstream side in the transporting direction to the other transporting surface from which a work has been carried out to the downstream side in the transporting direction immediately before the rotation.

* * * * *